United States Patent
Avery et al.

(10) Patent No.: US 9,182,966 B2
(45) Date of Patent: Nov. 10, 2015

(54) ENABLING DYNAMIC SOFTWARE INSTALLER REQUIREMENT DEPENDENCY CHECKS

(71) Applicant: INTERNATIONAL BUSINESS MACHINES CORPORATION, Armonk, NY (US)

(72) Inventors: Kenytt D. Avery, Newport Beach, CA (US); Edward L. Bader, Los Angeles, CA (US); Freddy I. Naime, Costa Mesa, CA (US); Chi M. Nguyen, Irvine, CA (US); Kevin N. Trinh, Garden Grove, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 14/144,864

(22) Filed: Dec. 31, 2013

(65) Prior Publication Data
US 2015/0186125 A1 Jul. 2, 2015

(51) Int. Cl.
*G06F 9/45* (2006.01)
*G06F 9/445* (2006.01)
*G06F 9/44* (2006.01)

(52) U.S. Cl.
CPC .. *G06F 8/61* (2013.01); *G06F 8/71* (2013.01); *G06F 9/44505* (2013.01); *G06F 9/445* (2013.01)

(58) Field of Classification Search
CPC ......... G06F 8/61; G06F 8/71; G06F 9/44505; G06F 9/445
See application file for complete search history.

(56) References Cited

U.S. PATENT DOCUMENTS 5,287,488 A * 2/1994 Sakata et al. .................... 703/22
5,689,711 A * 11/1997 Bardasz et al. ............... 717/105
(Continued)

FOREIGN PATENT DOCUMENTS

| WO | 2009/045089 A2 | 4/2009 |
| WO | 2012/069296 A1 | 5/2012 |

OTHER PUBLICATIONS

Alexander Keller et al., "Dynamic Dependencies in Application Service Management", [Online], 2000, pp. 1-7, [Retrieved from Internet on Jun. 26, 2015], <http://domino.watson.ibm.com/library/CyberDig.nsf/papers/23D100904BABE6758525692E00518E47/$File/rc21770.pdf>.*

(Continued)

*Primary Examiner* — Thuy Dao
*Assistant Examiner* — Ziaul A Chowdhury
(74) *Attorney, Agent, or Firm* — Patents on Demand P.A.; Brian K. Buchheit; Scott M. Garrett (57) ABSTRACT

An installer for installing a software program on a computing device can be executed. The installer can perform a set of dependency checks before installing the software program. The set of dependency checks can include the validation of a pre-requisites associated with the proper execution of the software program. The pre-requisites can be a portion of a dependency content. The content can be a checklist. Before the software program is installed on the device and responsive to executing the installer, the installer can update dependency content using a custom dependency checklist. The updating of the dependency content can be performed without updating code of the software program to be installed on the device. The execution of the installer can continue using the updated dependency content for performing the set of dependency checks responsive to automatically updating the dependency content.

19 Claims, 4 Drawing Sheets

(56) References Cited

U.S. PATENT DOCUMENTS

| | | | |
|---|---|---|---|
| 6,256,773 B1* | 7/2001 | Bowman-Amuah | 717/121 |
| 6,442,754 B1* | 8/2002 | Curtis | 717/175 |
| 6,567,829 B1* | 5/2003 | Ter Horst et al. | 715/273 |
| 6,865,737 B1* | 3/2005 | Lucas et al. | 717/178 |
| 7,418,700 B2* | 8/2008 | Zimniewicz et al. | 717/175 |
| 7,849,640 B2 | 12/2010 | Martin et al. | |
| 8,209,679 B2 | 6/2012 | Long | |
| 8,230,418 B2 | 7/2012 | Takatsu et al. | |
| 2002/0103973 A1* | 8/2002 | Zimniewicz et al. | 711/119 |
| 2003/0028869 A1 | 2/2003 | Drake et al. | |
| 2004/0143830 A1* | 7/2004 | Gupton et al. | 717/174 |
| 2004/0153869 A1* | 8/2004 | Marinelli et al. | 714/47 |
| 2004/0255291 A1* | 12/2004 | Sierer et al. | 717/174 |
| 2006/0248323 A1* | 11/2006 | Ewing et al. | 713/1 |
| 2006/0271924 A1* | 11/2006 | Calcaterra et al. | 717/168 |
| 2008/0046859 A1* | 2/2008 | Velarde et al. | 717/101 |
| 2008/0163092 A1* | 7/2008 | Rao | 715/771 |
| 2009/0144728 A1* | 6/2009 | Felts | 717/175 |
| 2009/0288080 A1 | 11/2009 | Partridge | |
| 2009/0300586 A1* | 12/2009 | Bernardini et al. | 717/126 |
| 2010/0031249 A1 | 2/2010 | Baliga et al. | |
| 2011/0154317 A1 | 6/2011 | Madduri et al. | |
| 2012/0159438 A1* | 6/2012 | Plate | 717/121 |
| 2012/0167072 A1 | 6/2012 | Boykin et al. | |
| 2012/0317075 A1* | 12/2012 | Pasumarthi et al. | 707/626 |
| 2013/0227542 A1* | 8/2013 | Pei et al. | 717/170 |
| 2014/0298292 A1* | 10/2014 | Minster et al. | 717/121 |

OTHER PUBLICATIONS

Steven Brandt et al., "Dynamic Deployment of a Component Framework with the Ubiqis System", [Online], 2009, pp. 1-7, [Retrieved from Internet on Jun. 26, 2015], <https://www.cct.lsu.edu/~sbrandt/UBIQIS.pdf>.*

G. Kecskemeti et al. "Automatic Deployment of Interoperable Legacy Code Services", [Online], 2005, pp. 1-7, [Retrieved from Internet on Jun. 26, 2015], <http://westminsterresearch.wmin.ac.uk/2418/1/Kecskemeti_Zetuny_Kiss_Sipos_Kacsuk_Terstyanszky_Winter_2005 final.pdf>.*

Marek Bell et al., "Domino: Exploring Mobile Collaborative Software Adaptation", [Online], 2006, pp. 1-16, [Retrieved from Internet on Jun. 26, 2015], <http://eprints.gla.ac.uk/3419/1/dominoPervasive2006.pdf>.*

IP.COM et al.; "Method and System to Install Runtime-Dependency Component Parallel", IPCOM000177399D, Dec. 12, 2008.

IP.COM et al.; Method and System for Validating and Assuring a Software Level of Systems . . . in a Test and Intergration Center (TIC), IPCOM000205365D, Mar. 28, 2011.

* cited by examiner

ENABLING DYNAMIC SOFTWARE INSTALLER REQUIREMENT DEPENDENCY CHECKS

BACKGROUND

The present invention relates to the field of software deployment and, more particularly, to enabling dynamic software installer requirement dependency checks.

Enterprise software solutions are usually dependent on third party components installed within an operating system to function properly. Components can often include databases, application servers, and/or operating systems. In many instances, these components and/or environments are constantly updated. These updates may occur out of cycle with updates to the enterprise software solutions. There are many execution environment configurations in which the software solution can be deployed. The large number of potential environments and continual updates of related components presents a challenge for software developers of installation tools.

To elaborate, installation tools typically perform pre-requisite checks during an install to ensure enterprise software can execute correctly. The dependency checks can be for specific versions of dependent third party components. When a pre-requisite check fails, the installer can fail to install the software. However, enterprise software requires release cycle development to update option lists and dependency checkers before a release statement about supporting the new versions can be made.

The enterprise software installer can fail for reasons ranging from component version incompatibility to component configuration incompatibility, even though the software being installed can execute correctly. To diagnose/debug installer failures, users frequently have to manually report failures to support entities. Consequently, there is little shared understanding of deployment across these groups, no shared automations, and no reuse of previous successful cycles, leading to configuration errors. This current approach is inefficient and static which results in lost productivity and decreases the quality of the user experience. It also severely hampers installation agents, who may be tasked with installation responsibilities, which these agents are unable to complete in a timely fashion. The disclosure provides these installation agents with needed and heretofore unavailable tools.

BRIEF SUMMARY

One aspect of the disclosure can include a system, an apparatus, a computer program product, and a method for enabling dynamic software installer requirement dependency checks. An installer for installing a software program on a computing device can be executed. The installer can perform a set of dependency checks before installing the software program. The set of dependency checks can include the validation of a pre-requisites associated with the proper execution of the software program. The pre-requisites can be a portion of dependency content. The content can be a checklist. Before the software program is installed on the device and responsive to executing the installer, the installer can update dependency content using the checklist. The updating of the dependency content can be performed without updating code of the software program to be installed on the device. The execution of the installer can continue using the updated dependency content for performing the set of dependency checks responsive to automatically updating the dependency content.

Another aspect of the disclosure includes a method, an apparatus, a computer program product, and a system for enabling dynamic software installer requirement dependency checks. An installation engine can be configured to dynamically update dependency content associated with a software installer installing a software program. The installer can perform a set of dependency checks before installing the software program. The set of dependency checks can include the validation of a pre-requisites associated with the proper execution of the software program. The pre-requisites can be a portion of dependency content. In the disclosure, a data store may exist for persisting updated dependency content customized for installing the software program on a specific computing device or set of computing devices.

DETAILED DESCRIPTION

The present disclosure is a solution for enabling dynamic software installer requirement dependency checks. Dynamic dependency checks are ones able to be selectively skipped, modified, or executed during an installation process per installing agent determinations. The dynamic dependency checks are able to be performed in a network-disconnected installation situation as well as in situations where software installations are network assisted (e.g., installations occurring over a network, or installations that utilize network acquired/updated components).

In embodiments, dependency check information is separated from a software installer permitting the dependency check information to be independently updated. The disclosure can permit the selective omission of dependencies. That is, the installer can be tailored to the deployment environment, maximizing the chance of a successful install. In one instance, in the event of installer failure, an installation report can be generated and conveyed to an appropriate support entity. In the instance, the installation report can be machine readable permitting automated analysis and solution recommendation generation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
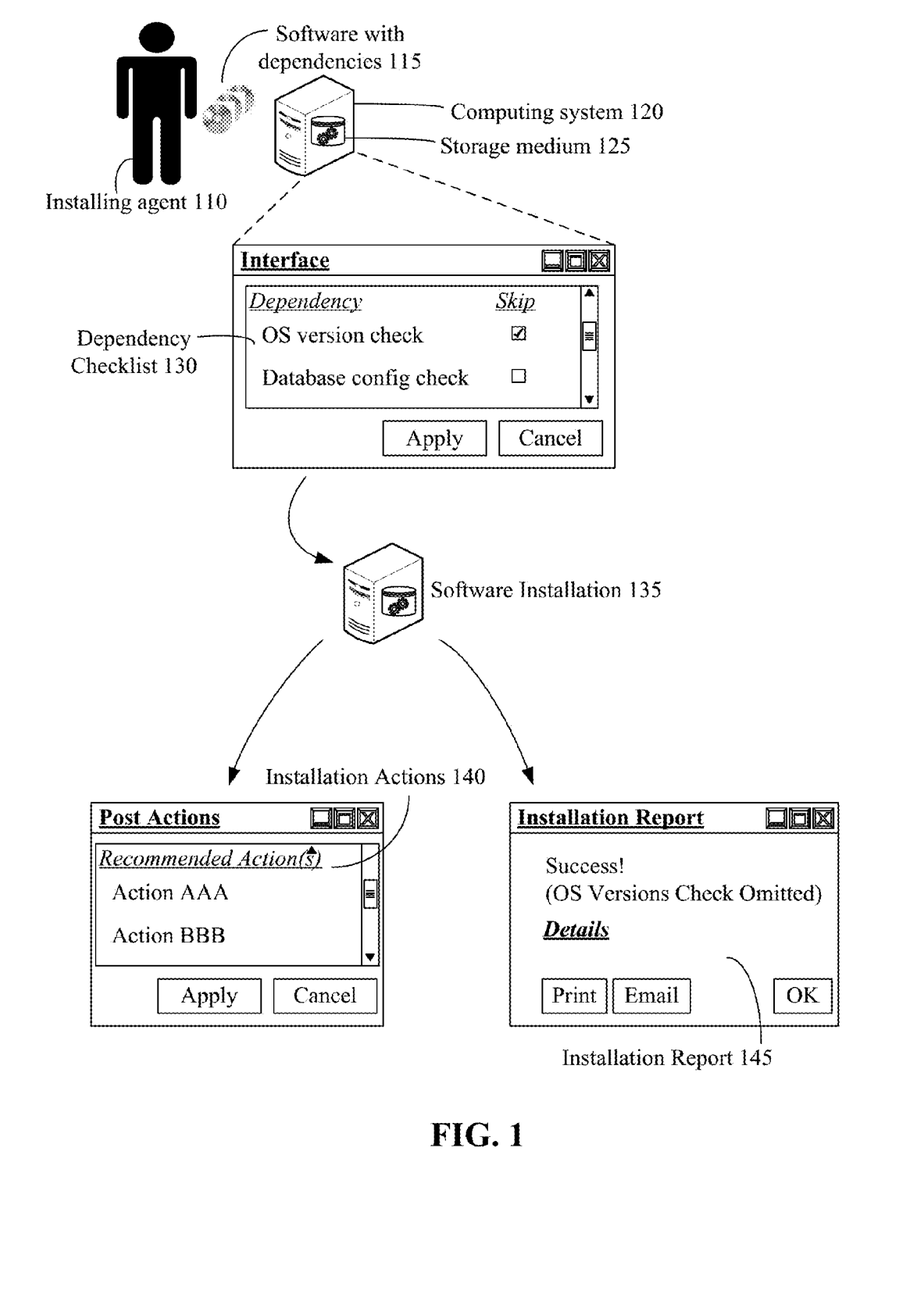
FIG. 1 shows an installation scenario for installing software with dependencies in accordance with embodiments of the disclosure.

Turning to the figures, FIG. 1 shows an installation scenario for installing software with dependencies in accordance with embodiments of the disclosure. The installation may be performed by an installing agent 110 from portable medium, such as a set of one or more installation CDs (compact disks) DVDs (digital video disks), portable FLASH drives, a portable hard drive, and the like. The portable medium includes the software having a set of dependencies 115. A reader of a computing system 120 reads the portable storage medium and locally installs the software with dependencies 115 on a storage medium of system 120. The installation process from a portable medium may be a stand-alone process able to be performed on a computing system 120, which is not necessarily connected to a network. Network assisted installations that rely on the dependency checklist 130 are contemplated in some embodiments.

During installation, the installing agent 110 is presented with an installation interface, which shows a dependency checklist 130. The checklist may have a number of dependency checks enabled by default, which the installing agent 110 may choose to disable or skip. Skipping one or more of these dependency checks permits installation to continue. This is a significant departure from traditionally installers and installation processes, which terminate an installation process whenever any of the dependency checks fail. In other words, the dependency checklists 130 places new level of control over the installation checks with the installing agent 110. Different levels of granularity, such as a hierarchical breakdown of specific checks into sub-checks are contemplated. Any number of software installation related checks, which may not be limited to dependency based checks, may be included in checklist 130.

In one embodiment, a custom dependency checklist 130 may be created for an installation, which includes updated or changed checking algorithms for specific installations. Thus, if problems with dependency checks (which are unrelated to an ability to install the actual software) are discovered, tailored solution may be created without affecting or changing the software being installed. Since the installing team (of which installing agent 110 is a member) may not legally (or technically) be able to make changes to the underlying software, the ability to modify installation dependency checks without changing underlying software may be significant. Further, by integrating a user interface for an dependency checklist 130 enables installing agents 110 of moderately low technical skill levels (with regard to software coding) to successfully perform tailored installations, which in absent of the disclosed innovations are highly challenging to impossible.

The software installation 135 progresses in accordance with the dependency checklist 130 selections. That is, one or more of the default dependencies checks may be skipped or replaced by custom installation checks. Additional installation checks may be added via checklist 130 selections in one embodiment. After (or while) the software installation 135 process occurs one or more actions may be recommended and/or prompted for, as represented by installation actions interface 140. The actions may include additional actions to be taken when possible, such as a future update of one or more components, for which dependency checks were skipped. Additionally, the actions may trigger tailored actions specific to the installation process.

User interface 145 represents a post-installation report, which is able to be generated during the installation process. The report may indicate a successful installation, with one or more of the dependency checks turned off and/or with alternative checks or actions enabled.

Figure 2:
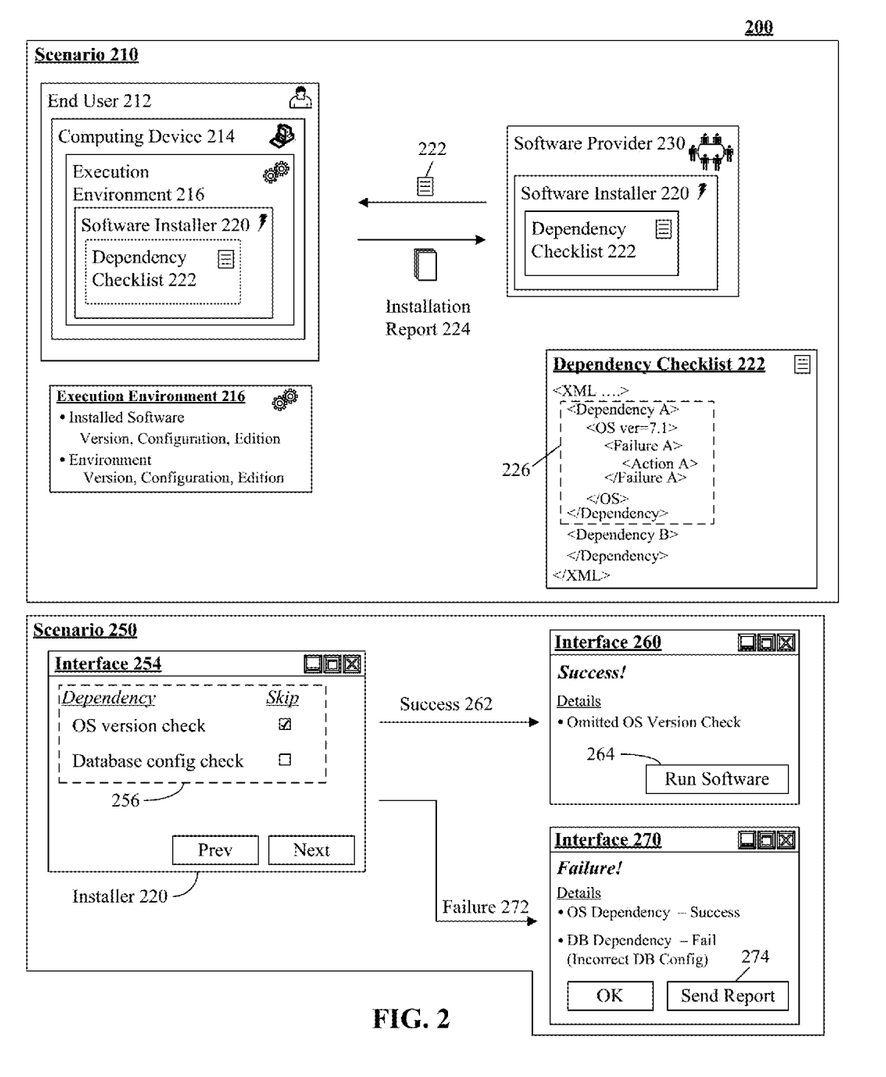
FIG. 2 is a schematic diagram illustrating a set of scenarios for enabling dynamic software installer requirement dependency checks in accordance with an embodiment of the inventive arrangements disclosed herein.

FIG. 2 is a schematic diagram illustrating a set of scenarios 210, 250 in accordance with an embodiment of the inventive arrangements disclosed herein. In scenario 210, an automatically updated dependency checklist 222 can be conveyed to a software installer 220 during execution of the installer 220. This conveyance may be over a network or from a portable medium in which the checklist is recorded. The installer 220 can produce an installation report 224 which can be utilized to continually improve checklist 222 for an execution environment 216.

It should be understood that the disclosure can streamline the software release cycle process by allowing support/test teams to perform updates to the dependencies (e.g., pre-requisites) for installation of the software and make them available to customers (e.g., end user 212). That is, this process saves time from escalating customer issues, saves developers from having to rebuild installers, create fix packs, release updated configuration files, or make other simple updates that do not require code changes. This process also decreases the number of customer support communication (e.g., calls, emails) by automatically updating the dependency checklist. In a use case, the disclosure utilized by a first customer would automatically log a failure if a new version of an operating system is in use and is not detected by the installer as a supported version. In the use case, once the failure has been analyzed and the update is made to the list of dependencies, every customer after that can successfully be able to install the software on the new version of the OS. The logging by the first customer may occur dynamically during installation (in a network connected installation) or may occur post-installation. Thus, even remote installations that may lack network connectively can result in customer (installing agent) provided feedback.

As used herein, installer 220 can be a computer program which installs files, such as applications, drivers, or other software, onto a computer. In one embodiment, installer 220 can install files within the installer 220. In another embodiment, installer 220 can install and/or execute the contents of a software package to be installed. In one instance, installer 220 can include a resource such as a dependency checklist 222. In the instance, the resource can be dynamically or manually updated without modifying the installer 220. It should be appreciated that installer 220 can include a software updater which can apply updates to existing installed software.

Checklist 222 can include one or more elements which can be associated with a successful execution of installer 220. In one embodiment, checklist 222 can include one or more software dependencies for a software package. Dependencies within the checklist 222 can include software editions, software configurations, software features, software component presence, operating system (OS) registry settings, and the like. For example, checklist 222 can be utilized to determine if a pre-requisite operating system software version (e.g., version 7.1) is present. In one embodiment, checklist 222 can be an Extensible Markup Language (XML) document which can be accessed by the installer during execution. In the embodiment, a dependency can be associated with one or more criteria, actions, and the like. For example, when an operating system version is older than version 7.1, the software installer 220 can fail gracefully and perform one or more clean up actions (e.g., Action A). It should be appreciated that checklist 222 is not limited to the XML format and can conform to any traditional and/or proprietary format. For example, checklist 222 can conform to a structured text document (e.g., comma delimited format).

Installer 220 can execute within execution environment 216 of computing device 214. Environment 216 can include, but is not limited to, installed software, operating system software, and the like. It should be appreciated that installed software and/or environment can vary based on version, configuration, edition, and the like. It should be appreciated that installer 220 can perform one or more traditional and/or proprietary operations during execution. Operations can include, but is not limited to, verifying system requirements presence, validating existing versions of the software, validating program files and folders presence, creating and/or updating program files and folders, adding configuration data (e.g., configuration files, registry entries, environment variables), creating links (e.g., shortcuts, or bookmarks), configuring components that run automatically (e.g., daemons or services), performing product activation, and the like.

In scenario 210, the software installer 220 can be obtained from a software provider 230. Installer 220 can include a dependency checklist 222 which can be obtained at the time of installer 220 conveyances and/or during installer 220 executions. For example, a software installer can be downloaded from a third party Web site and checklist 222 can be obtained from software provider 230 upon execution of the installer 220. It should be appreciated that checklist 222 can be obtained as a separate resource from installer 220. In one instance, checklist 222 can be persisted within device 214. In another instance, manual placement of the checklist 222 is contemplated for installations where no access to the internet or other external network is available. In still another instance, checklist 222 can be persisted remotely and can be accessed via a unique address (e.g., Uniform Resource Locator).

In one embodiment, the checklist 222 can automatically replace an existing checklist. In another embodiment, user 212 can be prompted to confirm replacement of an existing checklist with the checklist 222. In another embodiment, prior to running the installer, the user 212 can manually replace an existing checklist with the checklist 222.

In one embodiment, the checklist 222 can exposes a full list of dependencies to be checked. In the embodiment, if any of checks prove to be incorrect or out of date, users can disable any of the checks defined in the list, allowing a bypass and continue with a successful installation.

In scenario 250, an end user 212 can interact with software installer 220 to perform a custom software install. For example, end user 212 can utilize an interface 254 to dynamically adjust dependencies associated with the installer. In interface 254, dependencies within checklist 222 can be presented. In one configuration of the interface 254, dependency selection can be permitted. In the configuration, one or more dependencies can be omitted enabling customized dependency checking. For example, a user 212 can select an operating system version check to be skipped during installer 220 execution. In one use case, if the user 212 is trying to install using a newer version of a software dependency, the installer 220 can throw an error as the dependency is not marked as supported. In the use case, the user can force the installer to skip the check and complete the installation.

When installer 220 dependency check and/or installer 220 execution is successful (e.g., success 262), an interface 260 can be presented. In interface 260, dependency check details can be presented. For example, a summary (e.g., Omitted OS version check) of the omitted dependencies can be presented within interface 260. In one embodiment, installer 220 can permit the execution of installed software via an interface push button. For example, installer 220 can present a "Run software" button upon successful execution of dependency check and/or installer 220 execution.

When installer 220 dependency check and/or installer 220 execution is unsuccessful (e.g., failure 272), an interface 270 can be presented. In interface 270, dependency check details can be presented. For example, a summary (e.g., DB dependency failed) of the dependencies check can be presented within interface 260. In one configuration of the instance, installer 220 can permit the conveyance of an installation report 224 via an interface push button. For example, installer 220 can send automated feedback about a failure mode of the installer upon unsuccessful execution of dependency check and/or installer 220 executions. In one instance, one or more actions can be associated with failure 272. For example, a rollback action can be performed to restore environment 216 to a previous state.

In one embodiment, any failures can trigger the installer to automatically return a log file (e.g., installation report 224) to support detailing the failure and its possible causes. In case the installer cannot communicate with provider 230, the log file can be saved to a temporary location and made available for the user to send to support. That is, provider 230 and/or software installer 220 support personnel can then review the failures and determine potential fixes needed to the installer dependency checker/checklist 222.

It should be appreciated that installation report 224 can include, but is not limited to, metrics, logging data, dependency checklist 222, user selections, crash dump data, and the like.

Drawings presented herein are for illustrative purposes only and should not be construed to limit the invention in any regard. In one embodiment, interface 254, 260, 270 can be a screen of an IBM RATIONAL AUTOMATION FRAMEWORK FOR WEBSPHERE. It should be appreciated that the installer 220 can be associated with fix packs, interim fixes (e.g., patches), and the like. It should be appreciated that installer 220 can be an attended installer, silent installer, an unattended installer, an automated installer, a network installer, and the like. In one embodiment, the disclosure can perform the functionality described herein via an executable script, an executable binary, and the like.

Figure 3:
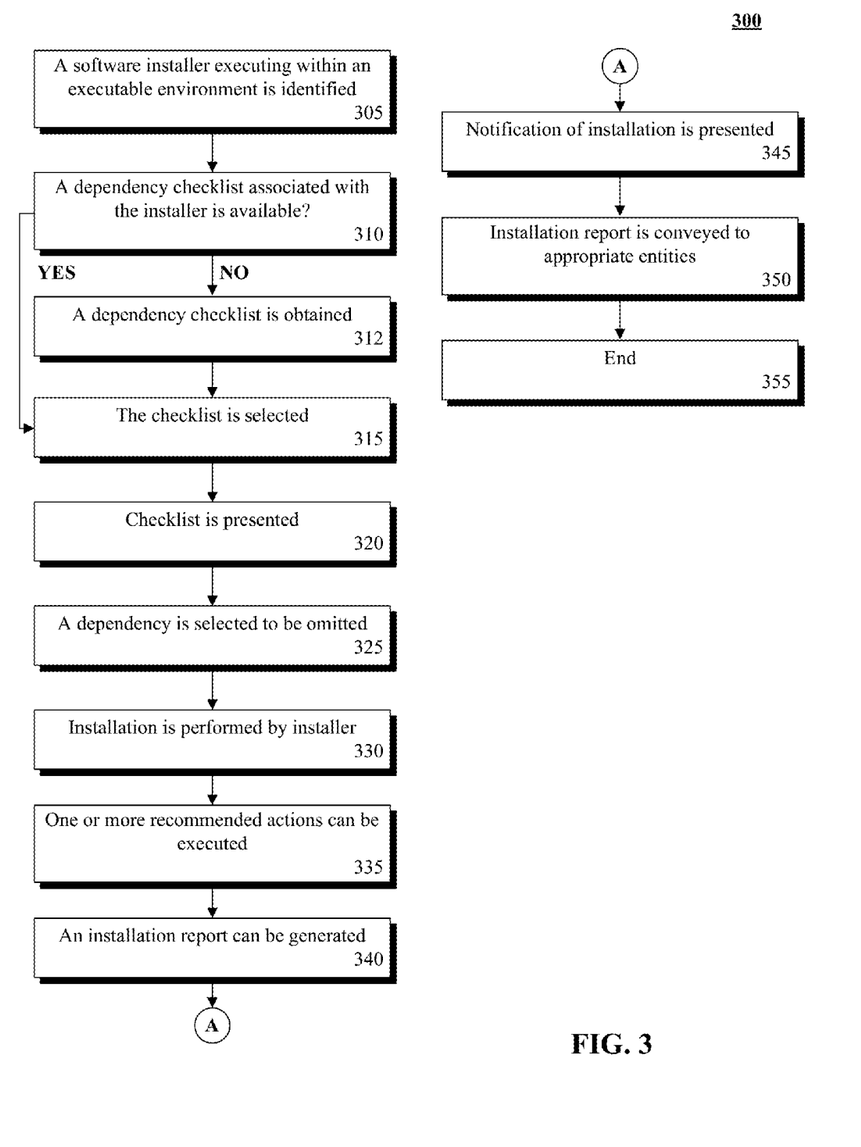
FIG. 3 is a schematic diagram illustrating a method for enabling dynamic software installer requirement dependency checks in accordance with an embodiment of the inventive arrangements disclosed herein.

FIG. 3 is a schematic diagram illustrating a method 300 for enabling dynamic software installer requirement dependency checks in accordance with an embodiment of the inventive arrangements disclosed herein. Method 300 can be performed in real-time or near real-time. In method 300, an installer can be associated with a dependency content which can be dynamically updated during installer execution.

In step 305, a software installer executing within an executable environment can be identified. The software installer can be a self-extracting installer, a software management tool of a software package system, and the like. In step 310, if a dependency checklist associated with the installer is available, the method can continue to step 315, else proceed to step 312. In step 312, a dependency checklist can be obtained. The checklist can be obtained manually and/or automatically. The checklist may be included in an installation disk or a companion disk read during installation. In one embodiment, the checklist may manually obtained by a user through a Web session (e.g., HTTP), File Transfer Protocol (FTP) session, and the like. In one configuration of the embodiment, the checklist can be obtained via a file selection dialog within an interface of the installer. In another embodiment, the checklist can be obtained dynamically via traditional and/or proprietary automated mechanisms. In one instance, the automated mechanism can utilize a trusted list of servers hosting the checklist which can be persisted within the checklist. In the instance, the server list can be dynamically updated when the checklist is updated. It should be appreciated that preferences can be configured to select servers by priority, user preference, and the like.

In step 315, the checklist can be selected. In one instance, the checklist can be associated with a profile. In the instance, the appropriate profile can be parsed and the checklist can be selected. In step 320, the checklist can be presented. The checklist can be presented in a traditional and/or proprietary manner. For example, the checklist can be presented within selection checkboxes which can enable customization of the checklist. In step 325, a dependency can be selected to be omitted. In step 330, the installation can be performed by the installer. In step 335, one or more recommended actions can be executed. In step 350, an installation report can be generated. In step 345, a notification of the installation can be presented. In step 350, an installation report can be conveyed to the appropriate entities. In step 355, the method can end.

Drawings presented herein are for illustrative purposes only and should not be construed to limit the invention in any regard. It should be appreciated that method 300 can include one or more optional steps permitting the functionality of the method 300 is retained. In one embodiment, method 300 can be a functionality of an installation wizard.

Figure 4:
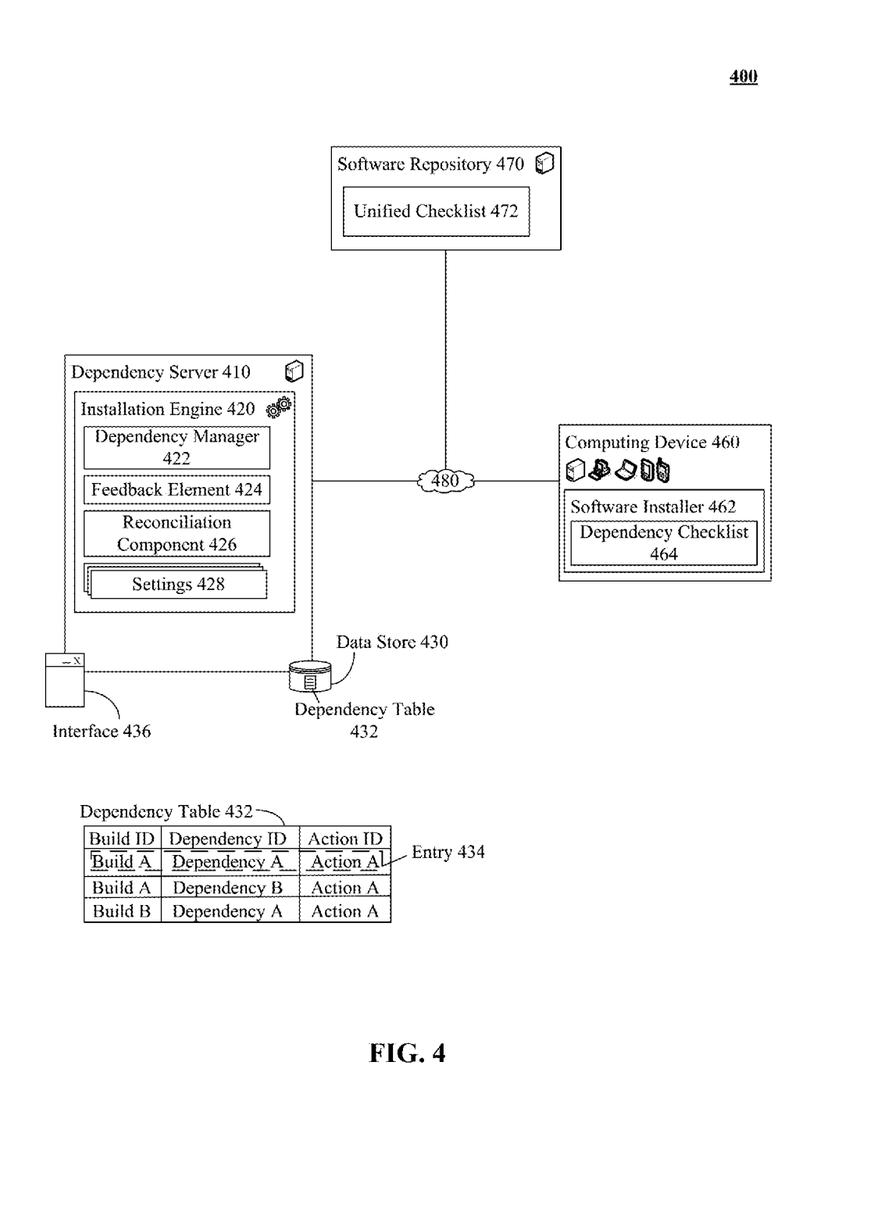
FIG. 4 is a schematic diagram illustrating a system for enabling dynamic software installer requirement dependency checks in accordance with an embodiment of the inventive arrangements disclosed herein.

FIG. 4 is a schematic diagram illustrating a system 400 for enabling dynamic software installer requirement dependency checks in accordance with an embodiment of the inventive arrangements disclosed herein. In system 400, an installation engine 420 can permit automated dependency check updates associated with an installer 462. System 400 can be communicatively linked via one or more networks 480. System 400 and/or system 400 components can be one or more elements associated with a software development lifecycle. In one instance, computing device 460 can be communicatively linked with a dependency server 410 and/or a software repository 470.

Although installation engine 420 is shown in FIG. 4 as being an engine of dependency server 410, embodiments are contemplated where engine 420 is a component of the software installer 462. Similarly, the unified checklist 472 shown in network 480 connected repository 470 may be a file or set of files stored on a portable storage medium, which is readable by computing device 460. In other words, embodiments are contemplated where the computing device 460 upon which an installation occurs is not connected to any network and where installation occurs from portable storage medium(s) read by a reader of computing device 460.

Dependency server 410 can be a hardware/software entity for executing installation engine 420. Server 410 functionality can include, but is not limited to, authentication, file sharing, load balancing, security functionality, and the like. Server 410 can include, but is not limited to, an installation engine 420, a data store 430, an interface 436, and the like. In one instance, server 410 can be a component of a software repository 470.

Installation engine 420 can be a hardware/software element for permitting dynamic dependency checks associated with an installer 462. Engine 420 functionality can include, but is not limited to, installer 462 execution, installer 462 registration, and the like. In one embodiment, engine 420 can be a component of an installer software Application Programming Interface (API). In one instance, engine 420 can utilize existing access control lists (ACL) to securely update dependency checklist 464.

Dependency manager 422 can be a hardware/software entity for managing dependencies associated with checklist 464. Manager 422 can include, but is not limited to, dependency addition, dependency deletion, dependency modification, and the like. In one instance, manager 422 can be a screen of a software development tool. For example, manager 422 can be an interface of an installer configuration tool.

Feedback element 424 can be a hardware/software element for obtaining and/or analyzing installation report associated with installer. Element 424 functionality can include, but is not limited to, metric collection, metric analysis, dependency checklist analysis, lexical parsing, and the like. In one instance, element 424 can parse a log file associated with an installation report of a successful or failed installer execution. For example, the element 424 can parse an XML log file to determine dependency failures. In another embodiment, element 424 can be utilized to compare two or more installation reports to determine dependency checklist failures, success, and the like. In the embodiment, the element 424 can present a tiered summary of multiple installation reports. For example, the summary can be an interactive document (e.g., HTML) permitting installer developers to analyze discrete portions of an installation report.

Reconciliation component 426 can be a hardware/software entity for resolving dependency check conflicts. Component 426 functionality can include, but is not limited to, dependency check recommendation, dependency checklist management, and the like. In one embodiment, component 426 can be utilized to perform dependency checklist updates. For example, the component 426 can be employed to push updates to client installers. In another embodiment, the component 426 can permit the assignation of a dependency checklist to an installer.

Settings 428 can be one or more rules for establishing the behavior of system 400, engine 410, and the like. Settings 428 can include, but is not limited to, dependency manager 422 options, feedback element 424 settings, reconciliation component 426 options, and the like. In one embodiment, settings 428 can be presented within an interface 436, computing device 460 interface, and the like. In one instance, settings 428 can be heuristically determined based on historic settings.

Data store 430 can be a hardware/software component able to persist table 432, settings 428, and the like. Data store 430 can be a Storage Area Network (SAN), Network Attached Storage (NAS), and the like. Data store 430 can conform to a relational database management system (RDBMS), object oriented database management system (OODBMS), and the like. Data store 430 can be communicatively linked to server 410 in one or more traditional and/or proprietary mechanisms. In one instance, data store 430 can be a component of Structured Query Language (SQL) compliant database.

Dependency table 432 can be one or more software entity dependencies associated with installer 462. Table 432 can include, but is not limited to, a software build identifier, a software edition, a software version, a dependency identifier, an action identifier, an action, and the like. For example, entry 434 can permit a table 432 to be linked to a software build (e.g., Build A) with a dependency (e.g., Dependency A) and an action (e.g., Action A) which can be performed based on an installer outcome. Table 432 can be utilized to generate a dependency checklist 464 for an installer 462.

Interface 436 can be a user interactive component permitting interaction and/or presentation of table 432, checklist 464, and the like. Interface 436 can be present within the context of a Web browser application, an integrated development environment (IDE), and the like. In one embodiment, interface 436 can be an IBM WEBSPHERE APPLICATION SERVER (WAS) admin console page. Interface 436 capabilities can include a graphical user interface (GUI), voice user interface (VUI), mixed-mode interface, and the like. In one instance, interface 436 can be communicatively linked to server 410, computing device 460, and the like.

Computing device 460 can be a software/hardware element for executing software installer 462. Device 460 can include, but is not limited to, input components (e.g., keyboard), interface 472, an application, output components (e.g., display), and the like. Device 460 hardware can include, but is not limited to, a processor, a non-volatile memory, a volatile memory, a bus, and the like. Computing device 460 can include, but is not limited to, a desktop computer, a laptop computer, a mobile phone, a mobile computing device, a portable media player, a PDA, and the like. It should be appreciated that installer 462 can be a binary executable. Installer 462 can conform to any executable programming language including, but not limited to JAVA, C++, C, PERL, and the like. In one instance, software installer 462 can be a portion of a package management system.

Software repository 470 can be a hardware/software entity for obtaining installer 462 and/or dependencies 472. Repository 470 can include, but is not limited to, a unified checklist 472, an interface (not shown), and the like. Repository 470 can be a storage location from which software packages can be retrieved and installed on a computer by installer 462. The software repository 470 may include functions of a source control system. In one embodiment, repository can convey an appropriate checklist to device 460 enabling dynamic tailoring of installer 462. In other embodiments, the software repository 470 is not needed, and checklist information is manually provided and/or is recorded in portable storage medium(s) used during an installation process.

Network 480 can be an electrical and/or computer network connecting one or more system 400 components. Network 480 can include, but is not limited to, twisted pair cabling, optical fiber, coaxial cable, and the like. Network 480 can include any combination of wired and/or wireless components. Network 480 topologies can include, but is not limited to, bus, star, mesh, and the like. Network 480 types can include, but is not limited to, Local Area Network (LAN), Wide Area Network (WAN), VPN and the like. Embodiments are contemplated where no network 480 connectively is required, such as when the dependency checklist 364 used during an installation is stored upon and/or loaded from a portable storage medium.

In one embodiment, the disclosure can communicate with existing software deployment and management tools to enable accurate updating of dependency check.

Drawings presented herein are for illustrative purposes only and should not be construed to limit the invention in any regard. It should be appreciated that system 300 can communicate utilizing traditional and/or proprietary protocols including, but not limited to, Transport Control Protocol (TCP), Internet Protocol (IP), Hypertext Transport Protocol (HTTP), and the like. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a dynamic installer comprising:
one or more processors executing an installer for installing a software program on a computing device, wherein said one or more processors executing the installer perform a set of dependency checks before installing the software program, wherein the set of dependency checks comprises of the validation of a pre-requisites associated with the proper execution of the software program, wherein the pre-requisites is at least a portion of a dependency content, wherein the content is a checklist;
before or while the software program is installed on the device and responsive to executing the installer, the installer, executed by the one or more processors, automatically updating dependency content using a dependency checklist that has one or more default dependency checks modified from a baseline installation to a customized installation specific for installing the software program on the computing device, wherein the customized installation skips at least one of the dependency checks as specified by the dependency checklist, wherein the updating of the dependency content is performed without updating code of the software program to be installed on the device; and
responsive to the one or more processors automatically updating the dependency content, the one or more processors continuing to execution of the installer using the updated dependency content for performing the set of dependency checks.

2. The method of claim 1, wherein the dependency checklist is based on an installing agent's selections of a user interface, which presents dependency checks and selectable options for enabling/disabling the presented dependency checks.

3. The method of claim 1, wherein the updating of the dependency checking occurs dynamically at runtime without requiring a refresh of the installer.

4. The method of claim 1, further comprising:
presenting a listing of dependencies to be checked during installation by the installer after dependency content is updated, wherein the presenting of the listing is to a human in charge of installing the software program; and
receiving from the human a selection to disable at least one of the dependencies, wherein not enabled ones of the dependency are not checked by the installer as it installs the software program on the device.

5. The method of claim 1, further comprising:
comparing a date associated with the dependency checks with a predefined date;
when the date is greater than the predefined date, permitting at least one human user to selectively disable one or more dependencies presented within a listing of dependencies, wherein not enabled ones of the dependencies are not checked when installing the software application; and
when the date is not greater than the predefined date, not providing an option for a human user to selectively disable any of the dependencies.

6. The method of claim 1, further comprising:
comparing a criteria associated with the dependency checks with a predefined criteria;
when the criteria is greater than the predefined criteria, permitting at least one human user to selectively disable one or more dependencies presented within a listing of dependencies, wherein not enabled ones of the dependencies are not checked when installing the software application; and
when the criteria is not greater than the predefined criteria, not providing an option for a human user to selectively disable any of the dependencies.

7. The method of claim 6, wherein the criteria is at least one of software component version, a software edition, results from shell scripts, and a configuration setting.

8. The method of claim 1, wherein the dependency content conforms to an Extensible Markup Language format.

9. A computer program product comprising a non-transitory computer readable storage medium having computer usable program code embodied therewith, the computer usable program code comprising:
computer usable program code stored in a non-transitory storage medium, if said computer usable program code is executed by a processor it is operable to execute an installer for installing a software program on a computing device, wherein said installer performs a set of dependency checks before installing the software program, wherein the set of dependency checks comprises of the validation of a pre-requisites associated with the proper execution of the software program, wherein the pre-requisites is at least a portion of a dependency content, wherein the content is a checklist;
computer usable program code stored in a non-transitory storage medium, if said computer usable program code is executed by a processor it is operable to automatically update dependency content using a dependency checklist that has one or more default dependency checks modified from a baseline installation to a customized installation specific for installing the software program on the computing device, wherein the updating of the dependency content is performed without updating code of the software program to be installed on the device; and computer usable program code stored in a non-transitory storage medium, if said computer usable program code is executed by a processor it is operable to continue to execute the installer using the updated dependency content for performing the set of dependency checks, responsive to updating the dependency content.

10. The computer program product of claim 9, further comprising:
computer usable program code, stored in a non-transitory storage medium, for detecting at least one error during the installation;
computer usable program code, stored in a non-transitory storage medium, for automatically reporting back the error over a network; and
the computer program product, using the content of the reported error for updating the dependency checks of the deployed installer or the dependency content conveyed over the network to the installer without changing the software program to be installed.

11. The computer program product of claim 9, wherein the updating of the dependency checking occurs dynamically at runtime without requiring a refresh of the installer.

12. A system comprising:
one or more processors;
a non-transitory storage medium storing computer usable program code executable by the processor, wherein the one or more processors execute the computer usable program code that causes the system to:
execute an installer for installing a software program on a computing device, wherein said one or more processors executing the installer performs a set of dependency checks before installing the software program, wherein the set of dependency checks comprises of the validation of a pre-requisites associated with the proper execution of the software program, wherein the pre-requisites is at least a portion of a dependency content, wherein the content is a checklist;
before or while the software program is installed on the computing device and responsive to executing the installer, the installer, executed by the one or more processors, automatically updating dependency content using a dependency checklist that has one or more default dependency checks modified from a baseline installation to a customized installation specific for installing the software program on the computing device, wherein the customized installation skips at least one of the dependency checks as specified by the dependency checklist, wherein the updating of the dependency content is performed without updating code of the software program to be installed on the device; and
responsive to the one or more processors automatically updating the dependency content, the one or more processors continuing to execution of the installer using the updated dependency content for performing the set of dependency checks.

13. The system of claim 12, wherein the dependency checklist is based on an installing agent's selections of a user interface, which presents dependency checks and selectable options for enabling/disabling the presented dependency checks.

14. The system of claim 12, wherein the updating of the dependency checking occurs dynamically at runtime without requiring a refresh of the installer.

15. The system of claim 12, wherein the one or more processors execute the computer usable program code that further causes the system to:
present a listing of dependencies to be checked during installation by the installer after dependency content is updated, wherein the presenting of the listing is to a human in charge of installing the software program; and
receive from the human a selection to disable at least one of the dependencies, wherein not enabled ones of the dependency are not checked by the installer as it installs the software program on the device.

16. The system of claim 12, wherein the one or more processors execute the computer usable program code that causes the system to:
compare a date associated with the dependency checks with a predefined date;
when the date is greater than the predefined date, permit at least one human user to selectively disable one or more dependencies presented within a listing of dependencies, wherein not enabled ones of the dependencies are not checked when installing the software application; and
when the date is not greater than the predefined date, not provide an option for a human user to selectively disable any of the dependencies.

17. The system of claim 12, wherein the one or more processors execute the computer usable program code that causes the system to:
compare a criteria associated with the dependency checks with a predefined criteria;
when the criteria is greater than the predefined criteria, permit at least one human user to selectively disable one or more dependencies presented within a listing of dependencies, wherein not enabled ones of the dependencies are not checked when installing the software application; and
when the criteria is not greater than the predefined criteria, not provide an option for a human user to selectively disable any of the dependencies.

18. The system of claim 17, wherein the criteria is at least one of software component version, a software edition, results from shell scripts, and a configuration setting.

19. The system of claim 12, wherein the dependency content conforms to an Extensible Markup Language format.

* * * * *